UNITED STATES PATENT OFFICE.

STANLEY JOHN PEACHEY, OF HEATON MERSEY, NEAR MANCHESTER, ENGLAND.

PLASTIC MATERIAL AND PROCESS OF PRODUCING SAME.

1,234,381.      Specification of Letters Patent.      Patented July 24, 1917.

No Drawing.      Application filed September 10, 1915. Serial No. 50,087.

*To all whom it may concern:*

Be it known that I, STANLEY JOHN PEACHEY, a subject of the King of Great Britain and Ireland, and resident of Heaton Mersey, near Manchester, England, have invented a new and Improved Plastic Material and Processes of Producing Same, suitable for use as a substitute for celluloid or leather and applicable for waterproofing, varnishing, lacquering, or electrical insulating purposes, of which the following is a specification.

This invention has for its object the production of a plastic substance or material which bears a close resemblance to celluloid or leather, and is suitable as a cheap and efficient substitute therefor, while being practically incombustible, or, if combustible, burning with difficulty. The said substance or material, while in a dissolved form, may be used for impregnating, or for applying to the surface of textile fabrics, paper, leather and the like for the purpose of rendering them water-proof and acid-proof and also for giving them a lustrous finish. The said substance or material, while dissolved, may also be used as a coating or "dope" for the treatment of aeroplane, airship, and balloon fabrics whereby they will acquire additional strength and rigidity and will at the same time be rendered impervious to air, gas and water. The dissolved substance or material may also be used as a varnish or lacquer for rendering wood, metal, stone or other surfaces proof against water, against acids, alkalis, chlorin and other corrosive agents and also against electrical penetration.

According to the invention, india-rubber, dissolved in a suitable solvent such as carbon tetrachlorid, or other solvent which does not react with chlorin, is treated with chlorin, the treatment being continued for such time as will insure the production of a hepta-chlor-caoutchouc as hereinafter specified.

On the treatment of the rubber being completed, the solvent is evaporated (preferably by exposing the solution to the air in somewhat thin layers, although other methods may be adopted), whereupon a plastic material is obtained which bears a close resemblance to celluloid.

An example of how the process may be carried out is as follows: 50 grams of plantation rubber are dissolved in 1250 c. cs. of carbon tetrachlorid and a current of chlorin gas is passed into the solution, which is kept constantly stirred. A considerable rise of temperature takes place and it is desirable to counteract this by employing a water-jacketed vessel, or a vessel containing a worm tube, through which cold water is kept circulating. The passage of the gas is continued until the desired weight of chlorin has been absorbed. In an average experiment using the above mentioned quantities of rubber and solvent, the best results are obtained when about 100 grams of chlorin have entered into combination with the rubber, but this amount may be varied within wide limits according to whether a hard and brittle product is required, or a softer and (or) more flexible one. If the latter is required a smaller amount of chlorin such however as will yield a product containing not less than 40% of chlorin is employed. During the treatment, the rubber is converted (or is partly converted) into a chlorin derivative, or a mixture of chlorin derivatives, by the combination of the molecules with chlorin, partly by addition and partly by substitution, the treatment being continued for such time as will insure the production of a heptachlor-caoutchouc as hereinafter specified.

If an organic filling agent (such as camphor) is added to the solution before, or after, the treatment of the rubber, or an inorganic filling agent (such as a pigment, or mineral) is added to the solution, after treatment of the rubber, a substance or material is produced resembling leather.

In using the substance for coating, varnishing, "doping" and like purposes, the solution is applied to the object to be treated before the solvent is evaporated.

As a modification, the original solution may be treated for the recovery of the somewhat expensive solvent by distilling off the latter in a current of steam, using a suitable still and condenser for the purpose. The solid chlorin compound thus obtained as a residue is then dried by exposure to the air, or by the use of a drying oven, and is subsequently dissolved in another and cheaper solvent, such as benzene, toluene, xylene, or a mixture of these, and the solution thus obtained may be employed either for the production of a material resembling celluloid or leather as aforesaid, or as a varnish for the purposes before named.

By mixing the chlorin derivative with a small amount of solvent, a dough is obtained which, in the case of a fabric or the like, may be applied by means of a spreading machine, or by the use of a friction calender.

Prior to use and before evaporation of the solvent the solution may be freed of dissolved acid vapors by shaking with an alkaline substance such as lime or sodium carbonate.

A further modification of the aforesaid process is to mix the original solution of the chlorin compound with a sufficient quantity of alcohol, petroleum ether, or other miscible liquid, which has practically no solvent action on the compound, when the latter is thrown out of solution as a solid plastic mass, which, after washing and drying, may be dissolved in any of the solvents before named. The solution may then be used as a varnish, "doping," or coating for the purposes named. Or, after evaporation of the solvent, the solid mass may be rolled into sheets by passing between warm calender rolls, or it may be molded into various forms by pressure and while warm in suitable molds.

Advantages arising from the application of the substance to a textile fabric, paper, leather and the like are that the fabric, paper or leather is rendered water-proof, acid-proof and less inflammable, and also acquires a lustrous finish. Further, when applied to a fabric and on drying the improved substance has a considerable contractile effect on the fabric, thereby rendering it stronger and more rigid than heretofore as well as rendering it impervious to air, gas, or water. Metal, ebonite, and other materials may be coated with the solution and, after drying, may be stoved at a moderately elevated temperature whereby a lustrous and strongly adherent lacquering is obtained. The substance or material also serves as an efficient insulator against electrical penetration.

By the use of dyestuffs soluble in any of the before mentioned solvents, the substance or material may be dyed to various colors.

What I claim is:—

1. The herein described composition of matter comprising a chlorin derivative of india-rubber obtained by dissolving rubber in a solvent which does not react with chlorin and treating the solution with chlorin gas until substantially the whole of the rubber is converted into heptachlor caoutchouc $C_{10}H_{13}Cl_7$, a substance characterized by the properties of plasticity and of extreme resistance to acids, alkalis, chlorin and other corrosive agents.

2. The herein described composition of matter comprising a chlorin derivative of india-rubber obtained by dissolving rubber in a solvent which does not react with chlorin and treating the solution with chlorin gas until the whole of the rubber is converted into heptachlor caoutchouc $C_{10}H_{13}Cl_7$, a substance characterized by the properties of plasticity and of extreme resistance to acids, alkalis, chlorin and other corrosive agents.

3. A new plastic material comprising a substance obtained by chlorinating rubber in carbon tetrachlorid solution until substantially the whole of the rubber is converted into heptachlor caoutchouc $C_{10}H_{13}Cl_7$, the amount of chlorin in the material being not less than 40% by weight, substantially as herein described.

4. A new plastic material comprising a substance obtained by chlorinating rubber in carbon tetrachlorid solution until the whole of the rubber is converted into heptachlor caoutchouc $C_{10}H_{13}Cl_7$, the amount of chlorin in the material being not less than 40% by weight, substantially as herein described.

5. The herein described composition of matter consisting of a chlorin derivative of india-rubber obtained by dissolving rubber in a solvent, which does not react with chlorin, and treating the solution with chlorin gas until substantially the whole of the rubber is converted into heptachlor caoutchouc $C_{10}H_{13}Cl_7$, a filling agent and a dye-stuff, substantially as described.

6. The herein described composition of matter comprising a chlorin derivative of india-rubber obtained by dissolving india-rubber in a solvent, which does not react with chlorin, and treating the solution with chlorin gas until substantially the whole of the rubber is converted into heptachlor caoutchouc $C_{10}H_{13}Cl_7$, and a filling agent, substantially as described.

7. The herein described composition of matter consisting of a new heptachlor derivative of india-rubber obtained by treating rubber dissolved in carbon tetrachlorid with chlorin, the proportions being as follows: 50 grams of plantation rubber, 1250 cubic centimeters of carbon tetrachlorid, and sufficient chlorin to yield a product containing 100 grams of chlorin combined with rubber, substantially as described.

8. A process for converting india-rubber into a heptachlor derivative which consists in treating india-rubber dissolved in a solvent, which does not react with chlorin, with chlorin, and subsequently separating the solvent, substantially as described.

9. A process for converting india-rubber into a heptachlor derivative which consists in treating india-rubber, dissolved in a solvent, which does not react with chlorin, with chlorin, and subsequently removing the solvent by evaporation or distillation, substantially as described.

In witness whereof I have hereunto set my hand in the presence of two witnesses.

STANLEY JOHN PEACHEY.

Witnesses:
FRED J. MEREDITH,
HARRY JUNCA.